United States Patent
Schatz et al.

(10) Patent No.: US 6,168,094 B1
(45) Date of Patent: Jan. 2, 2001

(54) FUEL INJECTION VALVE

(75) Inventors: Frank Schatz, Kornwestheim; Günter Dantes, Eberdingen; Detlef Nowak, Untergruppenbach; Jörg Heyse, Markgröningen, all of (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/445,519

(22) PCT Filed: Jan. 18, 1999

(86) PCT No.: PCT/DE99/00092

§ 371 Date: Dec. 7, 1999

§ 102(e) Date: Dec. 7, 1999

(87) PCT Pub. No.: WO99/53194

PCT Pub. Date: Oct. 21, 1999

(30) Foreign Application Priority Data

Apr. 8, 1998 (DE) ............................................. 198 15 800

(51) Int. Cl.⁷ .................................................. F02M 61/00
(52) U.S. Cl. .................... 239/533.12; 239/491; 239/494; 239/584; 239/585.1; 239/590; 239/596
(58) Field of Search .................................. 239/491, 494, 239/496, 497, 533.12, 584, 585.1, 585.4, 585.5, 590, 590.3, 596, DIG. 19

(56) References Cited

U.S. PATENT DOCUMENTS

| | | |
|---|---|---|
| 5,484,108 * | 1/1996 | Nally .............................. 239/585.4 X |
| 5,533,482 | 7/1996 | Naitoh . |
| 5,570,841 * | 11/1996 | Pace et al. ......................... 239/585.1 |
| 5,685,491 * | 11/1997 | Marks et al. ....................... 239/596 X |
| 5,766,441 * | 6/1998 | Arndt et al. ....................... 239/596 X |
| 5,899,390 * | 5/1999 | Arndt et al. ................... 239/585.1 X |
| 5,924,634 * | 7/1999 | Arndt et al. ....................... 239/596 X |
| 6,050,507 * | 4/2000 | Holzgrefe et al. ................. 239/585.1 |

FOREIGN PATENT DOCUMENTS

| | | |
|---|---|---|
| 34 43 005 | 7/1990 | (DE) . |
| 196 07 288 | 10/1996 | (DE) . |
| 196 37 103 | 3/1998 | (DE) . |
| WO 96 11335 | 4/1996 | (WO) . |

* cited by examiner

*Primary Examiner*—Andres Kashnikow
*Assistant Examiner*—Steven J. Ganey
(74) *Attorney, Agent, or Firm*—Kenyon & Kenyon

(57) ABSTRACT

A fuel injection valve is is described. The fuel injection valve includes a swirl disk downstream from a valve seat, the swirl disk being made of at least one metallic material, having at least two swirl channels opening into a swirl chamber, and in which all layers are adheringly deposited directly one on top of the other by electroplating (multilayer electroplating). A perforated spray disk having an outlet opening shaped so that it directly influences the flow of the fuel exiting through the outlet opening of the swirl disk is arranged directly downstream from the swirl disk. The fuel injection valve is particularly well suited for direct injection of fuel into the combustion chamber of a compressed mixture externally ignited internal combustion engine.

15 Claims, 4 Drawing Sheets

FUEL INJECTION VALVE

FIELD OF THE INVENTION

The present invention is based on a fuel injection valve.

BACKGROUND INFORMATION

German Patent no. 39 43 005 describes an electromagnetically actuated fuel injection valve, in which a plurality of disk-shaped elements are arranged in the seat area. When the magnetic circuit is excited, a flat valve plate used as a flat armature is lifted from an opposite valve seat plate interacting with it, the valve plate and the valve seat plate jointly forming a valve plate part. A swirl element that sets the fuel flowing to the valve seat in a circular swirling motion is arranged upstream from the valve seat plate. A stop plate limits the axial path of the valve plate on the side opposite the valve seat plate. The valve plate is surrounded by the swirl element with a certain amount of clearance between them; thus the swirl element guides the valve plate to a certain degree. The bottom face of the swirl element is provided with a plurality of tangential grooves, which extend from the outer periphery to a central swirl chamber. Due to the fact that the bottom face of the swirl element rests on the valve seat plate, the grooves have the form of swirl channels.

World Patent 96/11335 describes a fuel injection valve, which has a multidisk pre-swirl atomizer projection on its downstream end. This atomizer projection is provided downstream from a disk-shaped guide element built into a valve seat carrier and a valve seat that is also located on the valve seat carrier, an additional support element holds the atomizer projection in a well-defined position. The atomizer projection is made of two disks or four disks, the individual disks being made of stainless steel or silicon. Conventional machining operations, such as erosion, punching and etching, are used in the production of the opening geometries in the disks. Each individual disk of the atomizer projection is manufactured separately, after which all the disks of the same size are stacked in the desired number to form the full atomizer projection.

German Patent Application No. 196 07 288 describes a multilayer electroplating process for manufacturing perforated plates, which are particularly suitable for use in fuel injection valves. This principle of disk manufacturing by multiple metal electrodeposition of different metallic structures one on top of the other so that a single-piece disk is obtained should be expressly considered part of the disclosure content of the present invention. Micro-electroplating in a plurality of levels, layers, or strata is therefore utilized in the manufacture of the swirl disks used in the present invention.

SUMMARY

The fuel injection valve according to the present invention has the advantage that it allows a very high quality of atomization of a fuel to be injected and a highly variable jet or spray formation, which is adapted to the individual requirements such as installation conditions, engine configuration, cylinder shape, or spark plug position, to be achieved. As a result, exhaust gas emissions and fuel consumption can be reduced by the use of multilayer plated swirl disks in conjunction with perforated spray disks on the injection valve of an internal combustion engine.

In a very advantageous manner, the perforated spray disk is provided with an outlet opening, which allows the flow of the swirling fuel exiting from the swirl disk to be directly affected. Thus, the jet is shaped in a simple manner after the swirl is produced. The static injection amount and the jet parameters concerning the jet angle are set separately by the geometric arrangement of the two disks having the corresponding injection geometries. The static flow amount is set using the swirl disk, while the spray angle (both the opening angle of the actual jet or spray and spray angle y with respect to the longitudinal valve axis when oblique injection is used) are set using the perforated spray disk.

The outlet opening of the perforated spray disk is oblique with respect to the longitudinal axis of the valve in a particularly advantageous manner, so that the swirling spray takes an oblique direction, with specific jet patterns and spray shapes being attainable due to the asymmetric form of the outlet opening, which can be particularly advantageous when the fuel injection valve is used for direct injection into a cylinder of an internal combustion engine.

Due to their metallic construction, the swirl disks are unbreakable and easy to install. The use of multilayer electroplating provides considerable freedom of design, since the contours of the opening areas (inlet area, swirl channels, swirl chamber, outlet opening) can be freely selected in the swirl disk. In particular, compared to silicon disks, where the contours are strictly predefined due to the crystal axes (truncated pyramid), this flexible shaping is very advantageous.

Metal deposition has the advantage, in particular compared to the manufacture of silicon disks, of a great variety of materials being available. The most diverse metals with their different magnetic properties and hardnesses can be used in the micro-electroplating process for the manufacture of swirl disks. The different hardnesses of the various metals can be used in a particularly advantageous manner by creating a sealing metal area.

It is of particular advantage to construct the swirl disk from three layers in that three electroplating steps are performed for metal deposition. The upstream layer represents a cover element, which fully covers the swirl chamber of a central swirl-producing layer. The swirl-producing layer is made of one or more material regions, which, due to their outlines and geometric position with respect to one another, predefine the outlines of the swirl chamber and the swirl channels. The individual layers are arranged one on top of the other without gaps or joints using an electroplating process so that they represent a completely homogeneous material. In this context, the term "layer" is used only to facilitate understanding.

Two, three, four, or six swirl channels are advantageously provided in the swirl disk. The material regions can have different shapes depending on the desired outline of the swirl channels; they may be stepped or spiral-shaped, for example. Also the outlines of the swirl chamber, the cover layer, and the outlet opening can be configured in a flexible manner.

DETAILED DESCRIPTION

Figure 1:
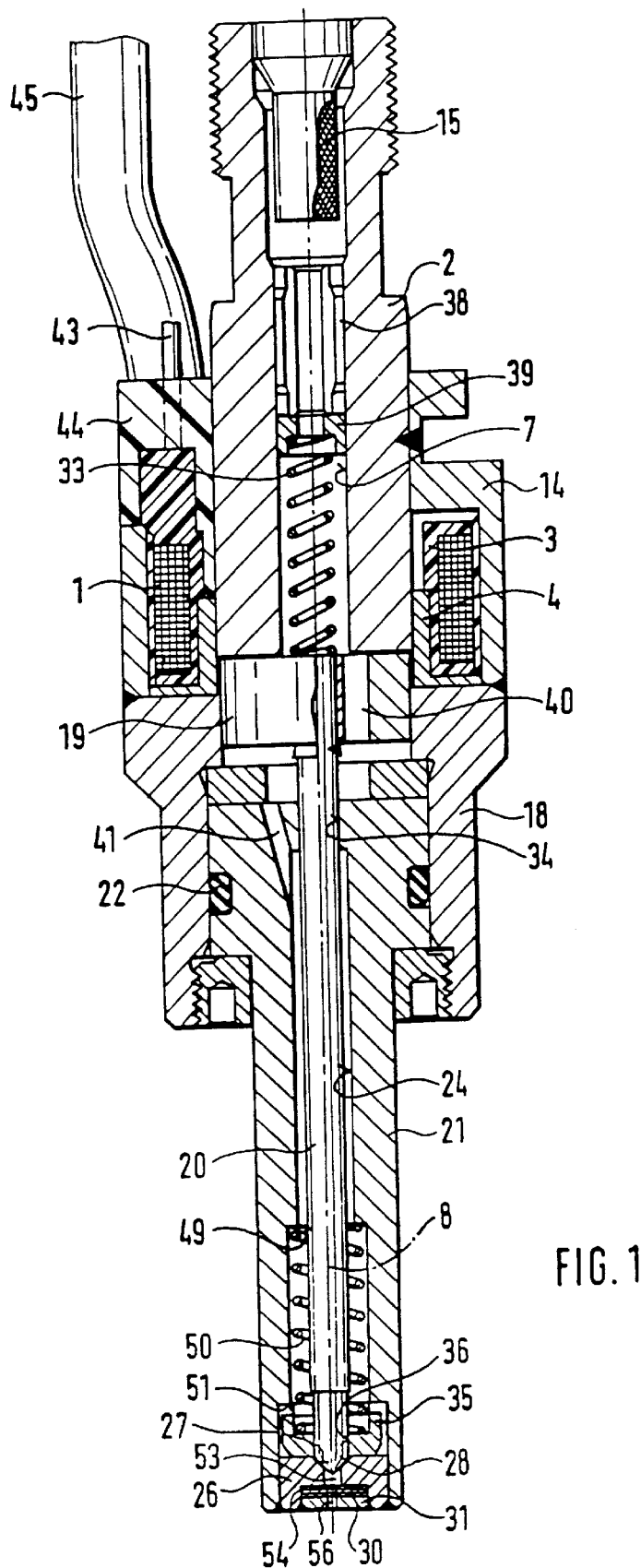
FIG. 1 shows a cross section of a fuel injection valve according to an example embodiment of the present invention.

The electromagnetically actuated valve represented in FIG. 1 as an example in the form of an injection valve for fuel injection systems of compressed mixture, externally ignited internal combustion engines has a tubular, largely hollow cylindrical core 2 serving as the internal pole of a magnetic circuit, which is at least partially surrounded by a magnet coil 1. The fuel injection valve is well suited in particular to serve as a high-pressure injection valve for direct injection of fuel into the combustion chamber of an internal combustion engine.

A plastic bobbin 3, which is stepped, for example, accommodates the winding of magnet coil 1 and allows, in conjunction with core 2 and an annular, non-magnetic intermediary part 4, partially surrounded by magnet coil 1 and having an L-shaped cross section, the injection valve to have a particularly compact and short design in the area of magnet coil 1.

Core 2 has a longitudinal through hole 7, which extends along longitudinal valve axis 8. Core 2 of the magnetic circuit also serves as a fuel inlet fitting, longitudinal hole 7 representing a fuel supply channel. An external metal (e.g., ferritic) housing part 14 is firmly attached to core 2 above magnet coil 1 closing the magnetic circuit as the external pole and outer conduction element and fully surrounds magnet coil 1 at least in the circumferential direction. A fuel filter 15, responsible for removing fuel components that due to their size might clog or damage the injection valve, is provided on the inlet side of longitudinal hole 7 in core 2. Fuel filter 15 is installed in core 2 by pressing, for example.

Core 2 forms, together with housing part 14, the inlet end of the fuel injection valve, with top housing part 14, viewed in the axial downstream direction, for example, slightly extending beyond magnet coil 1. A tubular bottom housing part 18, which surrounds and accommodates an axially movable valve part having an armature 19, a rod-shaped valve needle 20, and a longitudinal valve seat carrier 21, is sealingly attached to top housing part 14. The movable valve part can also take the form of a flat disk with an integrated armature, for example. The two housing parts 14 and 18 are permanently attached to one another by a circumferential weld, for example.

In the embodiment illustrated in FIG. 1, bottom housing part 18 and largely tubular valve seat carrier 21 are firmly screwed together; however, joining methods also may include welding, soldering, or crimping. An annular gasket 22, for example, ensures the seal between housing part 18 and valve seat carrier 21. Valve seat carrier 21 has an internal through hole 24 running through its entire axial extension, concentrically to longitudinal valve axis 8.

With its lower end 25, which also represents the downstream end of the entire fuel injection valve, valve seat carrier 21 surrounds a valve seat element 26, having a valve seat surface 27, inserted in through hole 24, which is tapered in the shape of a truncated cone in the downstream direction. Valve needle 20, which is rod-shaped, for example, having a largely circular cross section, is arranged in through hole 24, and has a valve closing section 28 at its downstream end. This valve closing section 28, which is conically tapered, for example, interacts with a valve seat surface 27 provided in valve seat element 26 in a known manner. Downstream from valve seat surface 27, in a depression 54 of valve seat element 26, there is a swirl disk 30, which is manufactured by multilayer electroplating and has three metallic layers deposited one on top of the other. Furthermore, a perforated spray disk 31 is mounted in depression 54, downstream from swirl disk 30.

The injection valve is actuated electromagnetically in the conventional manner. The electromagnetic circuit with magnet coil 1, core 2, housing parts 14 and 18, and armature 19 are used to move valve needle 20 axially and thus to open the injection valve against the elastic force of a restoring spring 33 arranged in longitudinal hole 7 of core 2 and to close it. Armature 19 is connected, by a weld for example, to the end of valve needle 20 facing valve closing section 28 and aligned with core 2. A guide hole 34, provided in valve seat carrier 21 on the end facing armature 19, and a guide element 35, arranged upstream from valve seat element 26 having an accurately dimensioned guide hole 36, are used to guide valve needle 20 during its axial motion with armature 19 along longitudinal valve axis 8. Armature 19 is surrounded by intermediary part 4 during its axial motion.

Instead of the electromagnetic circuit, another excitable actuator, such as a piezostack, can also be used in a comparable fuel injection valve, or the axially movable valve part can be actuated by hydraulic pressure or servo pressure.

An adjusting sleeve 38, inserted, pressed in or screwed into longitudinal hole 7 of core 2 is used for adjusting the pretension of a restoring spring 33, whose upstream end rests on adjusting sleeve 38 via centering piece 39, and whose opposite end is supported by armature 19. One or more bore-like flow channels 40 are provided in armature 19, through which the fuel can flow from longitudinal hole 7 in core 2 via flow channels 41 formed downstream from flow channel 40 near guide hole 34 in valve seat carrier 21 into through hole 24.

The lift of valve needle 20 is defined by the position of valve seat element 26. One end position of valve needle 20 when magnet coil 1 is not excited is defined by the contact of valve closing section 28 with valve seat surface 27 of valve seat element 26, while the other end position of valve needle 20 when magnet coil 1 is excited is defined by the contact of armature 19 with the downstream face of core 2. The surfaces of the components of the latter stop area are chrome plated, for example.

Magnet coil 1 is electrically contacted and thus excited via contact elements 43, which are provided with a plastic coating 44 outside bobbin 3. Plastic coating 44 can also extend to other components such as housing parts 14 and 18 of the fuel injection valve. An electric connecting cable 45, which powers magnet coil 1, extends from plastic coating 44. Plastic coating 44 extends through top housing part 14, which is interrupted in this area.

Downstream from guide hole 34, through hole 24 of valve seat carrier 21 is designed with two steps, for example. A first shoulder 49 is used as the contact surface for a compression spring 50, which may be a helical spring, for example. With second shoulder 51, a larger space is created for the two disk-shaped elements 35 and 26. Compression spring 50, which envelops valve needle 20, pre-tensions guide element 35 in valve seat carrier 21, since it presses against guide element 35 with its side opposite shoulder 49. Downstream from valve seat surface 27, an outlet opening 53 is provided in valve seat element 26, through which fuel flows along valve seat surface 27 when the valve is open and subsequently enters swirl disk 30 and perforated spray disk 31. While perforated spray disk 31 is permanently connected to valve seat element 26, for example, by welding or gluing, swirl disk 30 is clamped or pressed in depression 54, since perforated spray disk 31 supports swirl disk 30 from below. The attachment version of swirl disk 30 illustrated in FIG. 1 is shown schematically only and only illustrates one of a plurality of attachment options, another one of which can be seen in FIGS. 3 and 4. A central outlet hole 56, through which the swirling fuel leaves the fuel injection valve and which also modifies the flow in the desired manner, is formed in perforated spray disk 31, which is also used as a support element.

Figure 2:
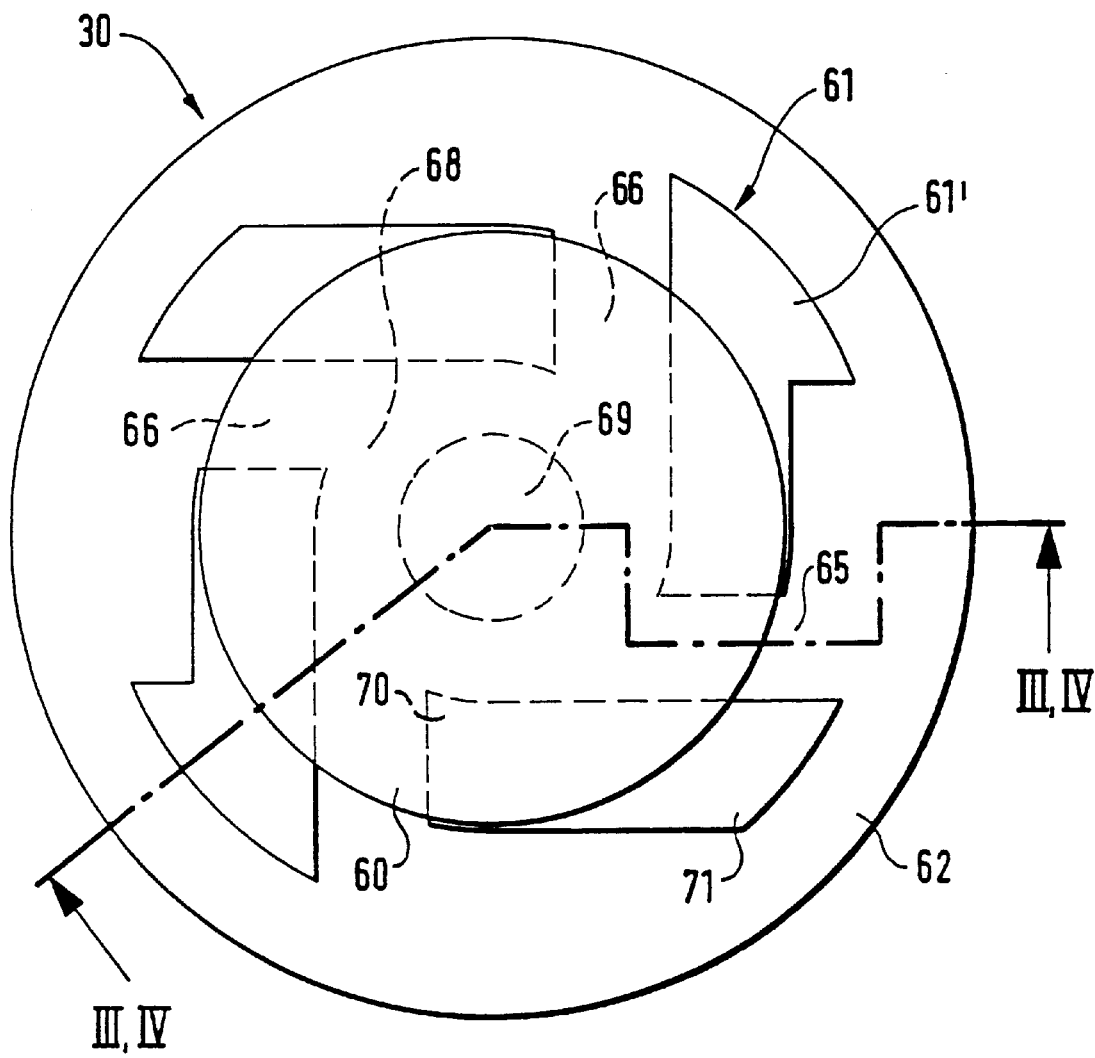
FIG. 2 shows a multilayer electroplated swirl disk built into a fuel injection valve, according to the present invention.

FIG. 2 shows a top view of a swirl disk 30 having one of the infinite number of geometries as an example. Such a swirl disk 30 is a single-part component, since the individual layers are deposited directly on one another, rather than being subsequently joined together. The layers of swirl disk 30 are electrodeposited consecutively, so that each subsequent layer is bonded to the layer below it by galvanic adhesion.

Swirl disk 30 is formed by three layers electrodeposited one on top of the other, which therefore follow one another axially when the swirl disk is installed. The three layers of swirl disk 30 are identified hereinafter according to their function as cover layer 60, swirl producing layer 61 and bottom layer 62. The top cover layer 60 has a smaller outer diameter than bottom layer 62. In this manner, it is ensured that the fuel can flow by outside cover layer 60 and thus can enter unimpeded into the outer inlet areas 65 formed by four swirl channels 66, for example, in central swirl producing layer 61. Swirl disk 30 can also be manufactured so it has more than three layers, the structure of the above-described layers 60, 61, 62 looks comparable to that described above, but, for example, a fourth (not illustrated) structure layer, which may be useful for certain construction conditions and because of the oncoming flow, is deposited on cover layer 60.

The upper cover layer 60 represents a closed metallic layer, which has no opening areas for the passage of the flow. On the other hand, a complex hole outline is provided in swirl producing layer 61, which runs through the entire axial thickness of this layer 61. The hole outline of the central layer 61 is formed by an internal, for example, circular, swirl chamber 68 and a plurality of swirl channels 66 opening into swirl chamber 68. The fuel receives a rotating impulse through the tangential or partly tangential and partly radial opening of swirl channels 66 into swirl chamber 68, and this impulse is preserved even in a central circular outlet hole 69 of bottom layer 62. The diameter of outlet hole 69 is, for example, considerably smaller than the opening width of swirl chamber 68, located immediately over it. This intensifies the swirl produced in swirl chamber 68. The fuel is sprayed by the centrifugal force in the shape of a hollow cone.

The outlines of swirl chamber 68 and swirl channels 66 are defined by material regions 61' of swirl producing layer 61. Material regions 61' are stepped and at a distance from the outer edge of swirl disk 30. The four material regions 61' are largely perpendicular to the respective adjacent material regions 61' and form swirl channels 66, covered by cover layer 60, at a certain distance from one another. Ends 70 of material regions 61', which radially delimit swirl chamber 68, are rounded in the shape of a shovel, for example, so that the outline of material regions 61' produces swirl in the fuel to be injected, and forms a circular swirl chamber 68. Ends 71 of material regions 61', opposite ends 70, also have rounded and, for example, also widened external outlines, defining a joint diameter, with which swirl disk 30 can be inserted and fastened in a spacer disk 72, for example, (FIGS. 3 and 4) in depression 54 in a simple manner.

Swirl disk 30 is designed to have a plurality of layers produced by electrodeposition (multilayer electroplating). Due to its manufacture by deep lithographic electroplating, there are specific features in shaping, some of which are briefly described below:

layers having uniform thicknesses over the disk surface;

largely perpendicular slits in the layers due to deep lithographic structuring, forming wetted hollow spaces (approximately 3° deviations from the optimally perpendicular walls may occur due to manufacturing tolerances);

desirable undercuts and overlaps of the slits due to the multilayer design of the individually structured metallic layers;

slits with any desired cross section shapes having walls that are largely parallel to the axis;

single-part design of the swirl disk, since the individual metal depositions are made directly one on top of the other.

The method of manufacturing swirl disks 30 is briefly explained in the following paragraphs. All steps of the electroplating method of producing a perforated disk have been described in German Patent Application No. 196 07 288. The characteristic feature of the method of successively using photolithographic steps (UV deep lithography) and subsequent microelectroplating is that it ensures high precision of the structures even on a large-surface scale, so that it is ideal for use in mass manufacturing of a very high number of pieces (high batchability). A plurality of swirl disks 30 can be manufactured simultaneously from a single wafer.

The point of departure of the method is a flat and stable substrate, which may be made of metal (titanium, steel), silicon, glass, or ceramic. Optionally at least one auxiliary layer is applied to the substrate initially. This may be a plating start layer (e.g., TiCuTi, CrCuCr, Ni), which is needed for conducting current in the subsequent microelectroplating step. The auxiliary layer is applied, for example, by sputtering or currentless metal deposition. After this pretreatment of the substrate, a photoresist is applied to the entire surface of the auxiliary layer, for example, by rolling or centrifugal coating.

The thickness of the photoresist should be the same as that of the metal layer to be applied in the subsequent electroplating step, i.e., the thickness of bottom layer 62 of swirl disk 30. The resist layer may have one or more layers of a photostructurable sheet or a liquid resist (polyimide, photoresist lacquer). If a sacrificial layer is to be electroplated onto the subsequently produced resist structures, the thickness of the photoresist must be increased by the thickness of the sacrificial layer. The metal structure to be achieved is transferred to the photoresist with a reverse photolithographic mask. One option is to expose the photoresist directly to UV light (printed circuit imaging or semiconductor imaging system) over the mask (UV deep lithography) and to subsequently develop it.

The resulting negative structure in the photoresist for subsequent layer 62 of swirl disk 30 is electrically filled with metal (e.g., Ni, NiCo, NiFe, NiW, Cu) (metal deposition). The metal is in close contact with the outline of the negative structure due to electroplating, so that the predefined outlines are accurately reproduced in it. In order to structure swirl disk 30, the steps starting from the optional application of the auxiliary layer must be repeated according to the number of desired layers, so that for a three-layer swirl disk 30 three electroplated layers are deposited. Different metals can also be used for the layers of swirl disk 30, with only one being used in each new electroplated layer.

In producing cover layer 60 of swirl disk 30, metal is deposited on both the conducting material regions 61' and the non-conducting photoresist in the area of swirl channels 66 and swirl chamber 68. For this purpose, a start layer of metal plating is applied to the resist of the previous middle layer 61. After depositing the upper cover layer 60, the remaining photoresist is removed from the metal structures by web chemical stripping. For smooth, passivated substrates, swirl disks 30 can be removed from the substrate and cut into individual pieces. For substrates with good adhesion of swirl disks 30, the sacrificial layer is selectively etched away from the substrate and swirl disk 30, which allows swirl disks 30 to be removed from the substrate and cut into individual pieces.

Figure 3:
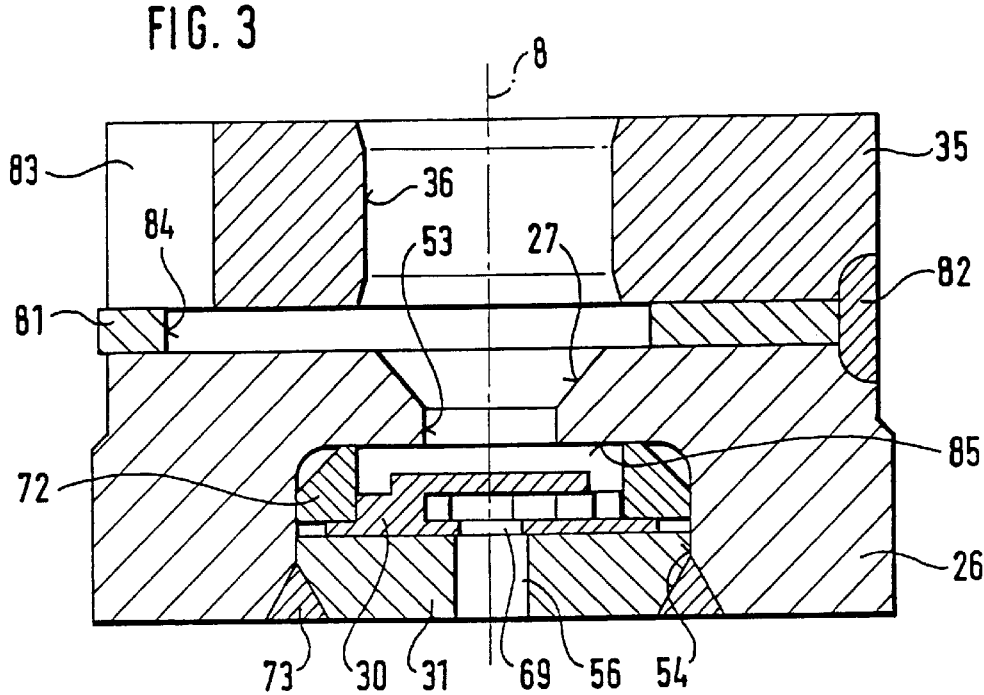
FIG. 3 shows a first embodiment of a downstream valve end, according to the present invention, the swirl disk taken along line III—III of FIG. 2.
Figure 4:
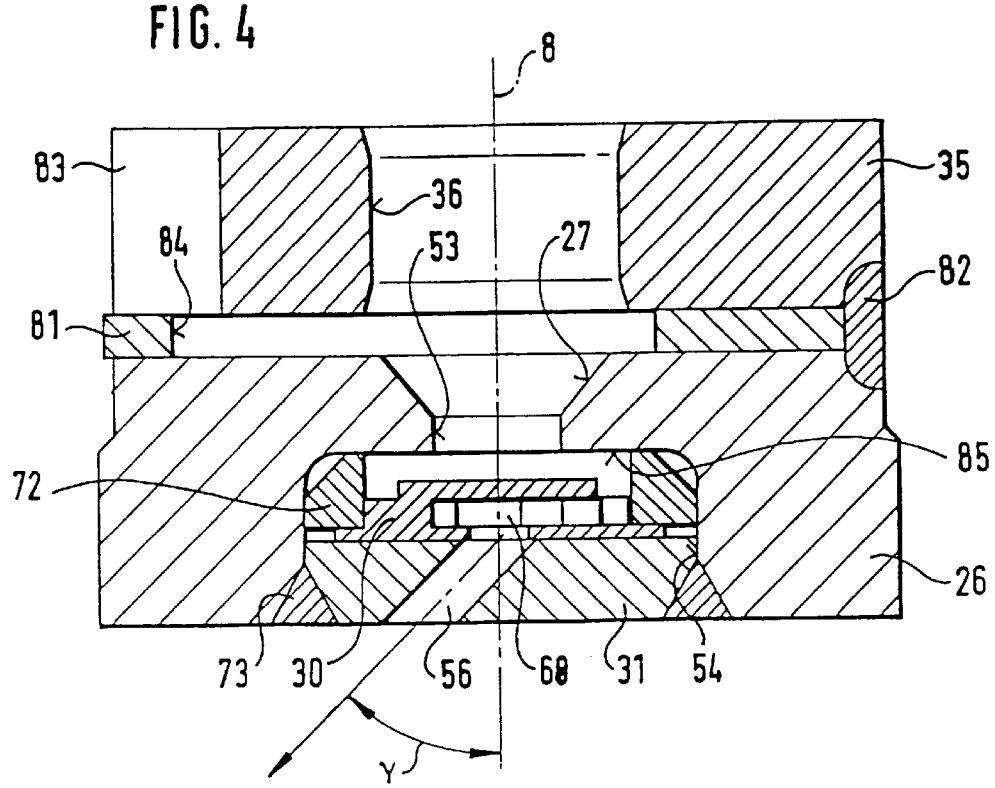
FIG. 4 shows a second embodiment of a downstream valve end, the according to the present invention, the swirl disk taken along line IV—IV of FIG. 2.

FIGS. 3 and 4 show two different embodiments of the valve ends designed according to the present invention, which have the same basic design as the downstream valve ends of FIG. 1. There are, however, differences in that a very flat fastening disk 81, in whose outer area guide element 35 and valve seat element 26 are permanently attached by a weld 82, for example, is inserted between guide element 35 and valve seat element 26. The outer periphery of guide element 35 has at least one groove-shaped or flat flow space 83 for the fuel, from which the fuel can flow to valve seat surface 27.

Fastening disk 81 has, at least in the area below flow space 83, an internal hole 84 having an opening width such that the fuel can enter unimpeded from flow space 83 and flow in the direction of longitudinal valve axis 8.

Swirl disk 30 and perforated spray disk 31 are arranged in depression 54 of valve seat element 26, the bottom face of perforated spray disk 31 ending flush with the bottom face of valve seat element 26, for example, whereby the downstream end of the entire fuel injection valve is also formed together with valve seat carrier 21. Perforated spray disk 31 is permanently attached to valve seat element 26 via an annular weld 73, produced by a laser, for example.

Swirl disk 30 rests on the top face of perforated spray disk 31, swirl disk 30 in turn being brought into a fixed position by spacer disk 72. Annular spacer disk 72 has a largely triangular cross section with two flat corners and has an inner diameter equal to the outer diameter of material region 61' with its rounded ends 71. Thus, swirl disk 30 can be accurately fitted in spacer disk 72, the bottom face of spacer disk 72 resting on bottom layer 62, since the latter has a larger outer diameter than the inner diameter of spacer disk 72. In order to prevent swirl disk 30 from slipping, perforated spray disk 31 presses swirl disk 30 and thus necessarily spacer disk 72 in depression 54 toward valve seat surface 27, so that spacer disk 72 rests on a top depression cover 85. Spacer disk 72 and perforated spray disk 31 have outer diameters that are approximately equal to the opening diameter of depression 54.

FIG. 3 shows a perforated spray disk 31, in which outlet hole 56 is concentric with longitudinal valve axis 8. The diameter of outlet opening 56 is only insignificantly greater than the diameter of outlet opening 69 of swirl disk 30, so that the flow of the swirling fuel exiting outlet opening 69 of swirl disk 30 can be directly influenced via outlet opening 56. The angle of the spray can be set in a simple manner using the size of the diameter of outlet opening 56 in perforated spray disk 31. The static amount of flow is determined by outlet opening 69 of swirl disk 30.

For direct gasoline injection, injection valves located directly on the combustion chamber and injecting a spray at an inclination to longitudinal valve axis 8 are advantageous, for example, due to certain installation conditions. A swirling, possibly rotationally symmetrical hollow conical spray with uniform distribution over the hollow cone should be produced. A possible variation of such specifications is shown in FIG. 4. Outlet opening 56, which begins at the middle of the top face of perforated spray disk 31 is inclined with respect to longitudinal valve axis 8 here and ends off center at the bottom face, the inclination of outlet opening 56 determining the spray angle of the overall spray to longitudinal valve axis 8. The direction of the jet is identified with an arrow and γ, γ indicating the angle of the spray to longitudinal valve axis 8, i.e., the axis of symmetry of swirl disk 30. Outlet opening 56 can also begin off center at the top face of perforated spray disk 31.

Figure 5:
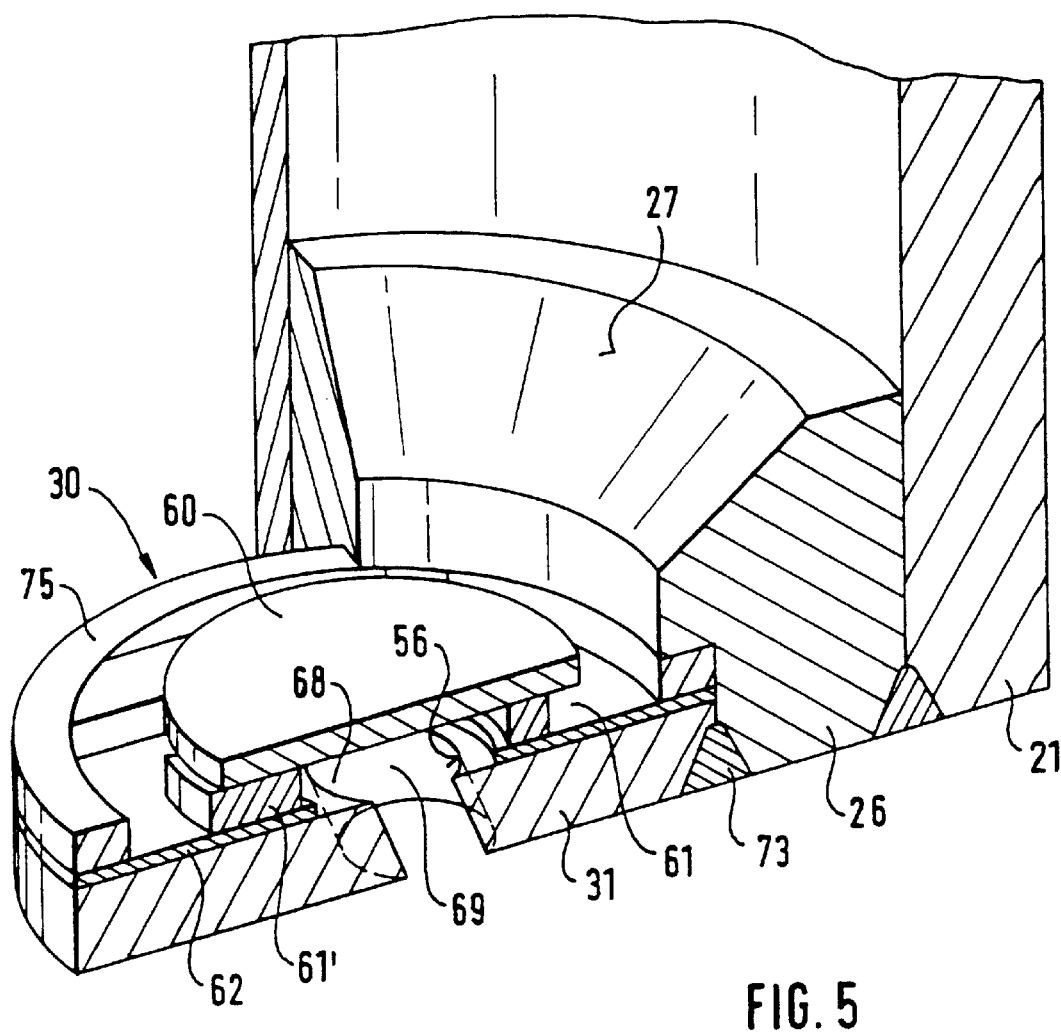
FIG. 5 shows a third embodiment of a downstream valve end, according to the present invention.

FIG. 5 shows an embodiment of a particular choice of materials for the individual layers 60, 61, 62 of swirl disk 30. Using multilayer electroplating, different metals (Ni, NiCo, NiFe, NiW, Cu) can be easily deposited one on top of the other, with only one metal being deposited within each electroplating layer. With this flexibility in the choice of materials, swirl disk 30 can be advantageously sealed when it is installed on the fuel injection valve. While cover layer 60 and bottom layer 62 are made of a harder plating material (e.g., NiCo), the middle swirl producing layer 61 and bottom layer 62 are deposited using a softer plating material (e.g., Ni). In manufacturing, only the electroplating vat is changed from NiCo to Ni and vice-versa when going from one plated layer to the other. The two layers 60 and 62 lend swirl disk 30 a high degree of stability due to the high strength of NiCo, which is necessary, for example, in high pressure fuel injection valves due to the high pressure load. In addition to the above-mentioned material regions 61' for forming swirl channels 66, swirl producing layer 61 has another outer annular material region 75.

Material region 75 runs uninterrupted over the periphery of swirl disk 30, serving as a sealing element. Since top cover layer 60 has a smaller diameter than layers 61 and 62 below it, the outer material region 75 is uncovered from above. This material region 75 of swirl disk 30 sealingly rests in a depression 54 of valve seat element 26. The soft material (Ni) of area 75 allows a greater upset path with relatively low mechanical stresses within material region 75. The upset path allows the upper sealing surface of material region 75 to rest in a form-fitting manner on the surface of hard valve seat element 26, which ensures the sealing function. With such a design, a separate sealing element can be advantageously omitted. Sufficient pressing force of material region 75 on valve seat element 26 is achieved in that perforated spray disk 31, which is attached to valve seat element 26 by weld 73, for example, and supports swirl disk 30, is arranged downstream from swirl disk 30. Perforated spray disk 31 has an outlet opening 56, which is comparable with the arrangement shown in FIG. 4 and is inclined with respect to longitudinal valve axis 8 in order to implement the oblique injection repeatedly mentioned before.

What is claimed is:

1. A fuel injection valve for a fuel injection system of an internal combustion engine, comprising:
   an actuator;
   a movable valve part, the actuator actuating the movable valve part;
   a stationary valve seat, the movable valve part interacting with the stationary valve seat to open and close the fuel injection valve;
   a valve seat element, the valve seat being formed on the valve seat element;

a multilayer swirl disk arranged downstream from the valve seat, the swirl disk composed of at least one metallic material and including at least one inlet area and at least one outlet opening, the swirl disk further including a swirl chamber and at least two swirl channels opening into the swirl chamber upstream from the at least one outlet opening, layers of the swirl disk being adheringly electrodeposited directly on top of one another; and a perforated spray disk having an outlet opening, the perforated spray disk being arranged downstream from the swirl disk, the outlet opening of the perforated spray disk being shaped to directly modify a flow of fuel exiting through the at least one outlet opening of the swirl disk.

2. The fuel injection valve according to claim 1, wherein the fuel injection valve directly injects fuel into a combustion chamber of an internal combustion engine.

3. The fuel injection valve according to claim 1, wherein the outlet opening of the perforated spray disk runs concentrically with a longitudinal axis of the fuel injection valve.

4. The fuel injection valve according to claim 1, wherein a diameter of the outlet opening of the perforated spray disk is only slightly greater than a diameter of the at least one outlet opening of the swirl disk.

5. The fuel injection valve according to claim 1, wherein the outlet opening of the perforated spray disk is inclined with respect to a longitudinal axis of the fuel injection valve.

6. The fuel injection valve according to claim 1, wherein the outlet opening of the perforated spray disk begins in a middle of a top face of the perforated spray disk, the top face facing the swirl disk.

7. The fuel injection valve according to claim 1, wherein the swirl disk includes a middle swirl producing layer, the middle swirl producing layer being formed by material regions arranged at a distance from one another in a peripheral direction, the material regions delimiting outlines of the swirl chamber and the swirl channels due to a geometric positioning of the regions with respect to one another.

8. The fuel injection valve according to claim 7, wherein the material regions are located at a distance from an outer periphery of the swirl disk.

9. The fuel injection valve according to claim 8, wherein the material regions are stepped.

10. The fuel injection valve according to claim 8, wherein the material regions define an outer joint diameter which corresponds to an inner diameter of a spacer disk.

11. The fuel injection valve according to claim 1, wherein at least two different materials are used for the layers of the swirl disk.

12. The fuel injection valve according to claim 11, wherein the swirl disk includes at least one material region, the material region providing a seal against the valve seat element.

13. The fuel injection valve according to claim 1, wherein the swirl disk and the perforated spray disk are arranged in a depression of the valve seat element.

14. The fuel injection valve according to claim 1, further comprising:

a spacer disk, the swirl disk pressed between the spacer disk and the perforated spray disk.

15. The fuel injection valve according to claim 1, wherein the perforated spray disk is attached to the valve seat element via one of welding and glue.

\* \* \* \* \*